United States Patent [19]
Gallucci

[11] Patent Number: 5,254,387
[45] Date of Patent: Oct. 19, 1993

[54] HIGH STRENGTH MULTI-LAYERED TAPE

[76] Inventor: Daniel Gallucci, 1523 N. Beverly Glen, Bel Air, Calif. 90077

[21] Appl. No.: 580,840

[22] Filed: Sep. 10, 1990

[51] Int. Cl.$^5$ .................. B32B 5/12; B32B 7/00; B32B 5/06

[52] U.S. Cl. ........................ 428/113; 428/114; 428/232; 428/245; 428/246; 428/251; 428/252; 428/284; 428/285; 428/294; 428/295; 428/301; 428/302; 428/408; 428/902

[58] Field of Search ............ 428/113, 245, 267, 268, 428/272, 294, 902, 190, 343, 354, 114, 232, 246, 251, 252, 284, 285, 295, 301, 302, 408

[56] References Cited

U.S. PATENT DOCUMENTS

| | | | |
|---|---|---|---|
| 2,135,057 | 2/1936 | Slayter et al. | 428/113 |
| 2,862,251 | 12/1958 | Kalwaites. | |
| 3,616,165 | 10/1971 | Nishi. | |
| 3,700,536 | 10/1972 | Bentvelzen et al. | 428/294 |
| 3,755,061 | 8/1973 | Schurb | 428/294 |
| 3,969,561 | 7/1976 | Marshall. | |
| 4,068,047 | 1/1978 | Dangel et al. | |
| 4,215,516 | 8/1980 | Huschle. | |
| 4,287,255 | 9/1981 | Wong et al. | |
| 4,410,586 | 10/1983 | Ladizesky et al. | 428/245 |
| 4,443,280 | 4/1984 | Standley | 428/113 |
| 4,511,615 | 4/1985 | Ohta. | |
| 4,532,169 | 7/1985 | Carley | 428/113 |
| 4,539,248 | 9/1985 | Brockington. | |
| 4,557,967 | 12/1985 | Willemsen et al. | |
| 4,567,070 | 1/1986 | Karass. | |
| 4,755,407 | 7/1988 | Mortensen et al. | |
| 4,808,473 | 2/1989 | Brooks. | |

Primary Examiner—George F. Lesmes
Assistant Examiner—James D. Withers
Attorney, Agent, or Firm—Graham & James

[57] ABSTRACT

A high strength multi-layered woven tape for increased structural support comprising a plurality of high strength ribbons joined with a group of high strength fibers by means of a flexible thermal plastic resin for attaching to structural components for improved support.

4 Claims, 1 Drawing Sheet

HIGH STRENGTH MULTI-LAYERED TAPE

FIELD OF THE INVENTION

This invention relates generally to a reinforcement tape; and more specifically, to a high strength multi-layered tape for use in the construction industry for reinforcement of structures.

BACKGROUND OF THE INVENTION

Natural disasters, such as earthquakes, hurricanes, and floods, dramatically illustrate how the forces of nature can easily destroy buildings of common construction. In the past, efforts to improve the structural integrity of buildings have included the use of steel bars to reinforce concrete and floating foundations for structures located in earthquake prone areas. It is also common to reinforce residential housing by employing additional structural support beams and piecemeal ties in construction plans.

The above-note construction techniques, however, not only significantly increase construction costs, but many also require alternation of the basic design or layout. For example, steel reinforced concrete can be quite expensive and utilization of additional beams and ties for residential buildings is not only costly, but brings to issue cost effectiveness. Other techniques such as floating foundations, often employed in earthquake prone areas, are expensive and raise significant questions of sufficiency and efficiency.

It would thus be desirable to provide for a cost-effective way to reinforce buildings or other structures or devices without being required to alter substantially existing construction or manufacturing design.

SUMMARY OF THE INVENTION

The high strength multi-layered tape of the present invention provides a novel way to structurally reinforce residential and commercial structures. By improving the structural support of structures, the present invention improves the chances of withstanding such natural catastrophes as earthquakes, hurricanes, and floods. The present invention discloses a multi-layered tape capable of binding the framed walls and ceilings of a building into a single unified structure. The use of the current invention in the basic framing of a building will lessen or prevent damage, resulting in greater safety for those inside, less economic loss, and even prevent the loss of life.

A further object of the present invention is to provide a novel reinforcement means that has a flexible characteristic making it suitable for use in a variety of applications and products. By way of example, but not limitation, the invention may be useable in motor vehicles, boats, and aircraft or other environments where structural strength is critical.

The present invention discloses a novel and improved high strength, multi-layered tape without adding the significant costs to construction or manufacture as is seen in existing methods of reinforcement. The multi-layered tape of the present invention also does not require substantial changes or alterations to the existing, pre-reinforced design of buildings or devices.

In construction, and other, applications, there is a critical need to tie the structural system together to preclude failure at the weakest element, component or connection. For example, in seismic design the weakest link is generally failure at connection points. The current invention binds all the different elements of support, thereby distributing loads and stresses throughout the structure as opposed to creating a particular weak point. The result serves to minimize the potential of failure at interconnection points. Thus, the high strength tape of the present invention minimizes localized stresses and prevents collapses that would normally result from a shift of loads caused by an earthquake, the severe winds of a hurricane, or the impact of flood waters. This shifting of loads could result in overloading of other structural elements and further failure.

Generally stated, high strength layered tape of the present invention incorporates a multi-layered encapsulation of materials having a different spatial orientation. A plurality of high strength ribbons are combined with a group of high strength fibers by a joining means into a continuous strip. The layered tape also includes an attachment means for attaching the tape to components of a structure. It is contemplated within the scope of the invention that a co-extrusion process may be used wherein the plurality of high strength ribbons are oriented longitudinally and the group of fibers are oriented in a web or woven pattern creating a flexible thermal plastic resin matrix. The co-extruded, multilayered tape may then have a polymer adhesive coating on one side for attaching said tape to the structural components of a building in order to ease the fastening of the tape to structural components.

The invention noted herein utilizes a class of materials not previously commonly available, to achieve its unique characteristics and results. The plurality of high strength ribbons have a high tensile or specific strength, extend along the longitudinal axis of the tape and may be selected from a group of materials consisting of aramid, carbon-graphite, boron, titanium alloys, aluminum alloys, steel alloys, E-glass, or S-glass fibers or hybrid thereof. The second group of fibers may also have a high tensile strength and are oriented in a webbed or woven pattern which results in a layer tape having a high shear strength. The group of fibers may be selected from a group of materials consisting of nylon, polyester, and fiberglass or similar fibers.

It is believed that a better understanding of the present invention, as well as recognition of how the present invention achieves the foregoing objects and attains various additional advantages to those sufficiently skilled in the art from a consideration of the following detailed description of the present invention. During the following detailed description, reference will be made to the appended sheet of drawings that are described immediately below.

DETAILED DESCRIPTION OF THE PREFERRED EMBODIMENT

Figure 1:
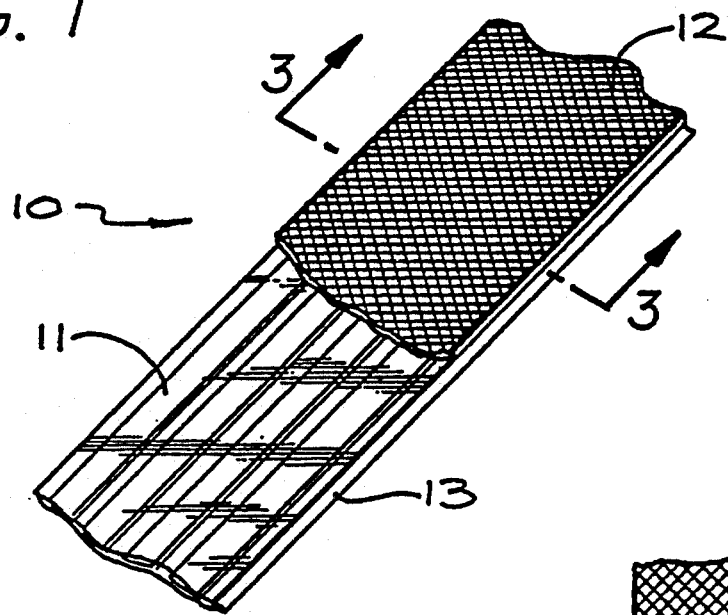
FIG. 1 is a perspective view of the multi-layer components of this invention.

Referring now to the drawings, FIG. 1 illustrates a perspective view of the preferred embodiment of the present invention. FIG. 1 illustrates a high strength, multi-layered woven tape 10 having high strength ribbons 11 in combination with a top layer 12 comprised of a continuous woven, webbed, or meshed pattern of high strength-material joined in a flexible polymer resin matrix carrier.

The high-strength woven or webbed material 12 consists of polyester, nylon, or fiberglass. The woven pattern results in the top layer 12 having a high shear strength. Beneath the woven high shear strength material 12 is the plurality of longitudinally oriented ribbons of high strength material 11.

Figure 2:
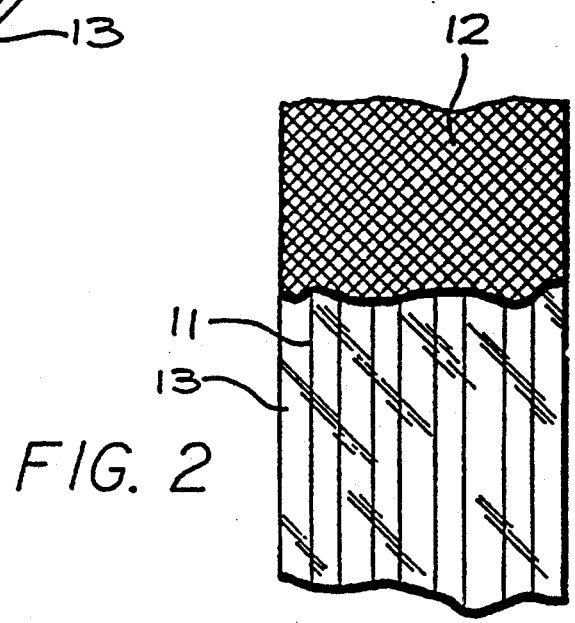
FIG. 2 is a top view, partly in section, of an embodiment of this invention.

In order to maximize the relationship between tensile and densities of fibers the specific strength of the materials must be taken into consideration. The ribbons of high strength material 11 can be selected from those materials listed in Charts 1 and 2. Chart 1 shows the specific strength, tensile strength divided by fiber densities, of a number of materials. These materials are recent materials developments for reinforcement in a matrix or carrier material 13, as shown in FIG. 2.

| CHART 1 | |
| --- | --- |
| Material | Specific Strength, $\times 10^6$ in. |
| Steel | 2.0 |
| Boron | 2.1 |
| High Modulus Graphite | 6.1 |
| E-Glass | 6.2 |
| High-Strength Graphite | 7.0 |
| S-Glass | 7.4 |
| Aramid (Regular 29) | 7.7 |
| Aramid (Resin impregnated) | 10.1 |
| Oriented Polyethylene | 10.7 |

Reinforcing fibers have specific strengths (tensile strengths divided by fiber densities) much greater than metals.

As in many cases, including the use of the current invention for structural reinforcement in buildings, weight is an important consideration. Therefore, looking at the material to be selected as the plurality of ribbons 11, it is desirable to select those materials not only having high specific strengths, as noted in Chart 1, but also high specific moduli. Certain possible ribbon 11 materials were also discussed in the summary of the invention. It is, of course, contemplated that the ribbons may be of two or more different materials in the same tape 10. The specific moduli of various materials is displayed in Chart 2, below.

| CHART 2 | |
| --- | --- |
| Material | Specific Modulus, $\times 10^8$ in |
| Steel Glass | 1.10 |
| E-Glass | 1.14 |
| S-Glass | 1.38 |
| Aramid (Kevlar 29) | 2.31 |
| Aramid (Kevlar 49) | 3.46 |
| Oriented Polyethylene | 4.85 |
| Boron | 5.00 |
| High-Strength Graphite | 5.00 |
| High-Modulus Graphite | 7.44 |

Specific modulus (modulus divided by fiber density of high-strength reinforcing fibers is significantly better than that of steel.

Lastly with respect to FIG. 1, layer 13 is shown in the preferred embodiment to be an extrudable, flexible polymer material that joins layers 12,13, with ribbons 11 to form the multi-layer composite tape of this invention.

Turning next to address FIG. 2, FIG. 2 is a top view of an embodiment of this invention illustrates one combination of the material. As is shown in FIG. 2, the top layer 12 of the present invention is shown in the preferred embodiment to be oriented at 45 degree angles to the longitudinal axis of the tape 10. While alternative orientations of the materials is clearly contemplated and within the scope of the present invention, it is important that the top layer 12 be at an angle of orientation different than ribbons 11 that lie parallel with the longitudinal axis of the tape 10.

It should be noted that the configuration of the longitudinally oriented ribbons 11 can be fibers of almost an infinite plurality. The ribbons 11 may also take on a multitude of shapes, including ribbons, tubular shapes, and any geometric shape manufacturable out of the high specific strength materials contemplated for ribbon 11. In the preferred embodiment, plurality of ribbons 11 are shown as a group of four ribbons and have a rectangular cross-section configuration. The cross-section configuration of ribbons 11 is best shown in FIG. 3.

Figure 3:
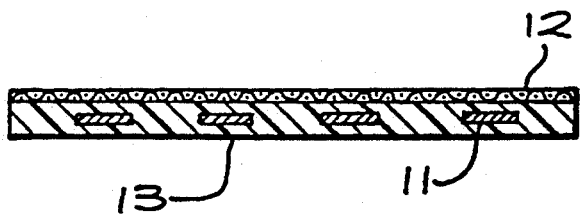
FIG. 3 is a view in cross section, taken in Plane 3—3 of FIG. 1, showing the multi-layer nature of this invention.

Turning then to FIG. 3 in greater detail, FIG. 3 is a cross-section view, taken in Plane 3—3 of FIG. 1, showing the multi-layer nature of the present invention. FIG. 3 illustrates tape 10 having layers 12, ribbons 11, and the flexible thermal plastic resin matrix or carrier means 13 extruded into a continuous tape. The woven layer 12 of FIG. 3, and as noted in the FIGS. 1 and 2, may consist of such materials as polyester, nylon, and fiberglass. It should be understood that other material may be employed, being limited only by the requirement that the materials have a relative high shear strength. Layer 12 may also take on a webbed configuration. A purpose of layer 12 is to enable to fastening of the high strength tape 10 to beams made of wood, and other materials such as aluminum or even steel, without tearing. The attaching of the tape 10 would be by such attaching means as nails, screws, bolts, and rivets. The resulting shear strength of layer 12 would prevent all tearing and ensure proper fastening.

In application, the tape, for example, would be run from beam to beam, tying up a standard room in a house almost as ribbons are placed around boxes of holiday presents, thereby creating a single structural entity. Additionally, the invention can be utilized in reinforcing roofing beams as well as floors and walls.

Figure 4:
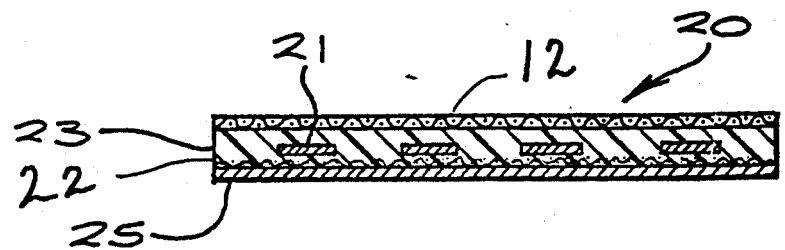
FIG. 4 is a cross sectional view, taken in Plane 3—3 of an alternative embodiment illustrating additional layers, including a layer of a polymer adhesive on one side of this invention.

An alternative embodiment of the invention is illustrated in FIG. 4. FIG. 4 illustrates longitudinally oriented high specific strength ribbons 21, a matrix of flexible polymer resin 23, a second woven, web-like mesh layer 22, and a polymer adhesive layer 25.

This alternative embodiment permits increased shear strength of the invention with a second, woven, web-like mesh layer 22 made of similar materials (polyester, nylon or fiberglass) to ribbon 21 of FIG. 4 and ribbon 11 of FIG. 1. It is preferable that the matrix or carrier means should be of a flexible, thermal plastic resin of such a type that would make the extrudable manufacture of the instant invention inexpensive and efficient. Obviously, the multilayered nature of the current invention may result in many combinations of layers. Additionally, it is contemplated that the placement of the high specific strength longitudinal material and the woven, webbed or meshed configured material may be varied from those particularly shown in the figures.

The angled orientation of the web-like mesh layer 22 lends quasi-isotropic (0°-45°-90°) shear strength characteristics. These strands in conjunction with fasteners make the effectiveness of the tape not dependent upon the adhesive/substrate bond.

Layer 25 may be a polymer adhesive of the type readily compatible with a co-extrusion manufacturing process. One of the methods of manufacture contemplated for making the tape is a pultrusion process where the ribbons and the woven layer are pulled through a bath of the flexible polymer matrix material. After pull through, the entire combination is then pulled through a die for shaping similar to hose dies utilized in extrusion. The curing of the polymer matrix material would cure in line during the pultrusion process by selection of the requisite polymeric material in combination with heat, time, or pressure.

An alternative method of manufacture could include the use of a partially cured polymer matrix which would be in a semi-solidified gelatin form, of sufficient consistency to support it being wrapped up in to coils of sheets of sufficient length. The sheets of flexible polymeric material would allow the insertion of the ribbons into the matrix by the use of pressure such as in extrusion, pultrusion or roll bonding.

Another alternative method could utilize a press and die set-up to manufacture sheets having unique shapes or for stamping unique shape for reinforcing structural components or a similar efficient manufacturing process for making the invention herein.

The utilization of an adhesive provides for the attaching of the present invention to the framing of a building prior to fastening with such items as nails, screws, rivets, and the like. The adhesive will hold the tape in place making fastening that much easier and efficient.

Further, the coating of the high specific strength materials with compatibilizers, such as organometallics, would improve the bonding of such materials with the flexible polymer matrix or carrier material. Examples of such organometallics compatibilizers are organosilanes and organotitanates. It should be understood that other organometallics are contemplated, limited only by compatibility with the use set forth.

Both the exemplary preferred embodiment and alternative shown here are not limited to the application as discussed. Rather, the present invention may be utilized in any situation where improved structural integrity may be required, such as in motor vehicles, boats, aircraft, and in any free standing structure or component or enclosure requiring structural reinforcement. It is also contemplated that it is within the scope of the invention that the tape may take a sheet-like form as opposed to a strip.

It will be understood that various modifications and changes may be made to the invention described above which may come within the spirit of this invention and all such changes or modifications coming within the scope of the appended claims are embraced thereby.

I claim:

1. A layered tape comprising:
   (a) a plurality of unidirection fibrous ribbons of high strength material formed from a material selected from the group consisting of E-glass, S-glass, aramid, carbon and oriented polyethylene;
   (b) a top layer of the tape comprising a group of woven fibers selected from the group consisting of polyester, nylon and fiberglass;
   (c) a carrier means of flexible polymeric material encapsulating said plurality of ribbons and joining thereto said group of woven fibers into a continuous tape; said plurality of ribbons arranged longitudinally in said continuous tape and said woven fibers oriented at an oblique angle relative to said ribbons; and
   (d) a polymer adhesive coating on one side of said layered tape for bonding to structural components.

2. The tape of claim 1 wherein said plurality of ribbons is positioned between said groups of woven fibers and said polymer adhesive.

3. A multi-layered, tape product manufactured according to the process steps of:
   (a) surrounding a plurality of high strength unidirectional fibrous ribbons with a flexible polymer material, said ribbons selected from the group consisting of E-glass, S-glass, aramid, carbon and oriented polyethylene;
   (b) joining a group of woven fibers selected from the group consisting of polyester, nylon and fiberglass with said ribbons and said flexible polymer material;
   (c) forming said ribbons, said woven fibers, and said flexible polymer material into a continuous tape, said plurality of ribbons arranged longitudinally in said continuous tape and said woven fibers oriented at an oblique angle relative to said ribbons; and
   coating one side of said tape with a polymer adhesive.

4. A structural enhancement support tape comprising:
   (a) a plurality of high strength unidirectional ribbons, formed from a material selected from the group consisting of E-glass, S-glass, aramid, carbon, and oriented polyethylene;
   (b) a group of woven fibers constructed in a web like pattern, selected from the group of fibers consisting of polyester, nylon, and fiberglass;
   (c) a flexible, thermal plastic resin encapsulating said plurality of high strength ribbons and joining thereto said group of woven fibers into a continuous tape;
   (d) compatibilizers of organometallics for coating said plurality of high strength ribbons for improved bonding with said flexible, thermal plastic reins; and
   (e) a polymer adhesive coating on one side of said continuous tape.

* * * * *